C. S. MORSE.
RESILIENT TIRE.
APPLICATION FILED SEPT. 20, 1920.
1,382,376.
Patented June 21, 1921
2 SHEETS—SHEET 1.
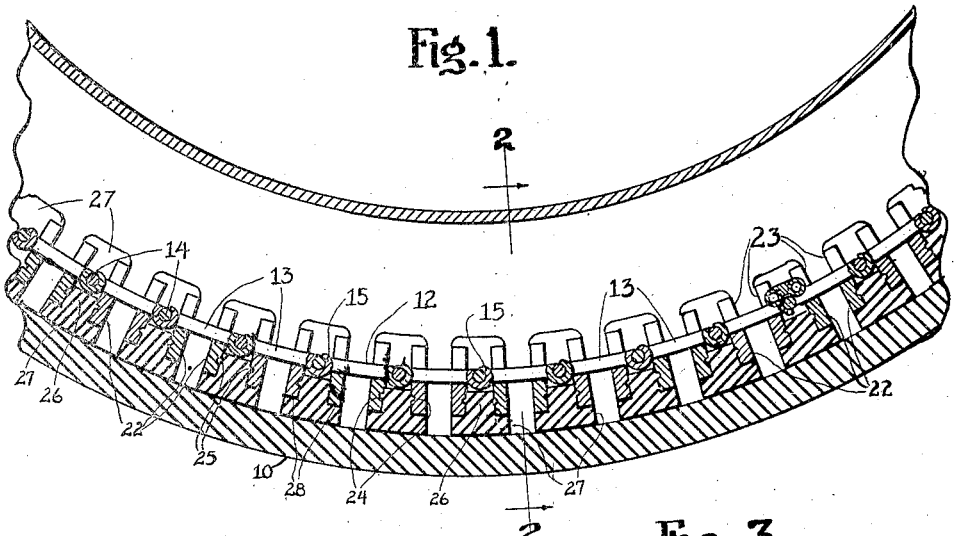
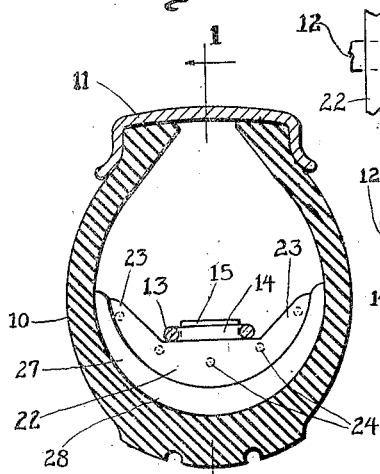
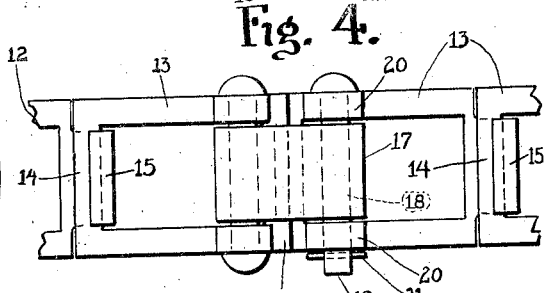
Witness
Geo L Laurence
Inventer
Clyde S. Morse
By Chas O Tillman
Att'y

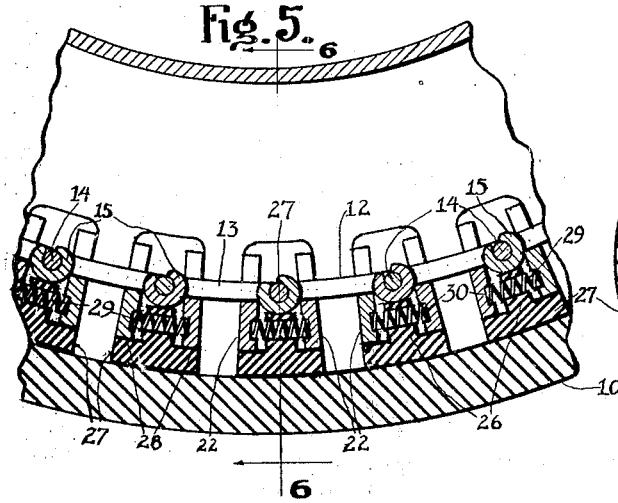
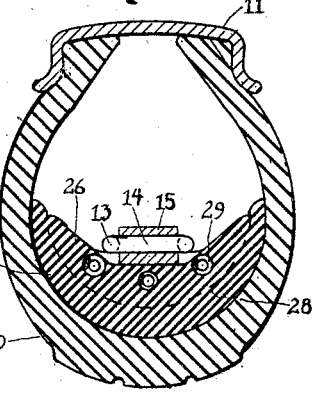
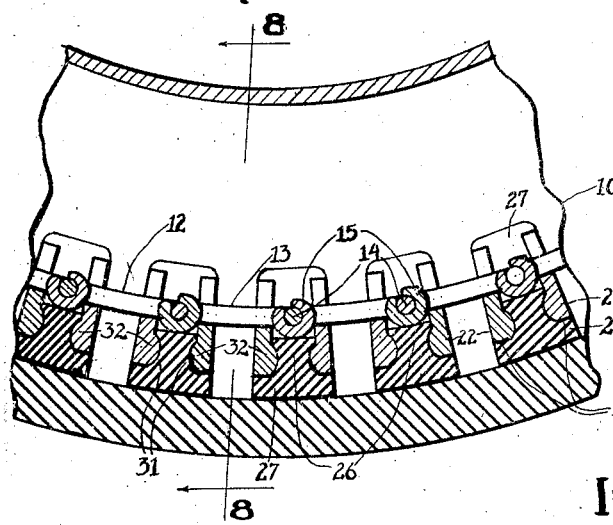
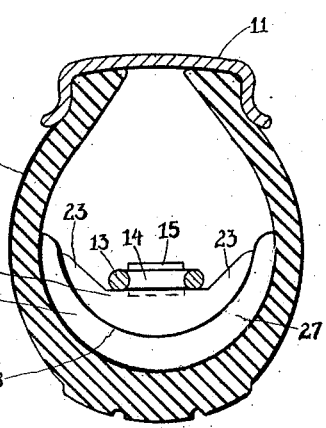
Inventer
Clyde S. Morse

UNITED STATES PATENT OFFICE.

CLYDE S. MORSE, OF DE KALB, ILLINOIS, ASSIGNOR OF ONE-HALF TO STELLA S. MORSE, OF DE KALB, ILLINOIS.

RESILIENT TIRE.

1,382,376.  Specification of Letters Patent.  Patented June 21, 1921.

Application filed September 20, 1920. Serial No. 411,532.

*To all whom it may concern:*

Be it known that I, CLYDE S. MORSE, a citizen of the United States, residing at De Kalb, in the county of De Kalb and State of Illinois, have invented certain new and useful Improvements in Resilient Tires, of which the following is a specification.

The invention relates to improvements in vehicle tires, and more particularly to the tires of automobiles and has for its principal object to provide a tire for vehicles which shall be simple in construction reliable and durable under all conditions of use and whose casing or tread portion shall be supported by resilient members and associated devices in such manner that its yielding and resilient quality will adapt it advantageously to take the place of a tire that is provided with an inner pneumatic tube in other words to furnish a puncture proof shock absorbing tire, having great strength, durability and the required resiliency, to be used in lieu of a pneumatic inner tube tire.

Another object of the invention is to so construct the filler or inner mechanism for the casing of the tire that said mechanism can be readily adapted to casings or tires of different sizes. A still further object of the invention is to provide a resilient tire of such construction and arrangement of its parts that if desired the casing of an ordinary pneumatic tire, whether new or used, or of high or low grade material, may be employed as one of the elements of the invention.

Other objects and advantages of the invention will be apparent from the following description and explanation.

The invention consists in certain peculiarities of the construction, novel arrangement, combination and operation of the various parts thereof as will be hereinafter more fully set forth and specifically claimed.

In the accompanying drawings, which serve to illustrate an embodiment of the invention—

Figure 1 is a sectional view taken circumferentially through a portion of the rim and tire of a wheel illustrating the parts in position for use.

Fig. 2 is a cross-sectional view taken on line 2—2 of Fig. 1 looking in the direction indicated by the arrows.

Fig. 3 is a view in side elevation of a portion of the flexible or expansible band which carries the supporting members for the tire casing, showing coupling means for uniting the adjacent ends of said band.

Fig. 4 is a plan view thereof.

Fig. 5 is a view similar to Fig. 1 illustrating a modification in the construction of the casing supporting members.

Fig. 6 is a cross-sectional view taken on line 6—6 of Fig. 5.

Fig. 7 is a view similar to Fig. 5 showing another modification in the form of the casing supporting members, and Fig. 8 is a cross-sectional view taken on line 8—8 of Fig. 7 as indicated by the arrows.

Corresponding numerals of reference designate like parts throughout the different views of the drawings.

Referring now more particularly to Figs. 1 to 4 inclusive of the drawings, the tire casing is designated by the numeral 10, and may be of the ordinary or well known construction and material and adapted for engagement with a rim 11 of any desired construction or type.

Located circumferentially within the casing 10 near its outer periphery and normally concentrically therewith, is a flexible or expansible band, which is designated as a whole by the numeral 12, and comprises a series of metal links 13, each of which is in the form substantially of a rectangular frame as shown in Fig. 4 of the drawings. The side members or rails of each of the links 13 are united transversely at one of their ends by a cross-sectionally rounded connecting rod or bar 14, and at their other ends by a hooked or looped bar or member 15, the hook portion of the last named bar or member adapted to be interposed between the side members of the link adjacent thereto and to loosely engage the connecting bar 14 on said link to permit of pivoted movement of the thus joined links with respect to one another.

By this arrangement it is obvious that a chain or band of any desired length to fit within a tire casing of the requisite size or diameter can be readily provided, by hooking the members 15 on the members 14 of a sufficient number of the links.

In order to detachably couple or connect the ends of the flexible band 12, composed of such links, I provide one of the end links 13, see Figs. 3 and 4, at its end adjacent the other end link with a transversely disposed and concaved buttress 16 to engage the member 14 of the last named link, and pivotally secure at one of its ends to the buttressed link and on the upper surface thereof, a coupling-arm 17 which is provided near its other end with a transverse opening 18 to receive a locking pin 19 which is extended through transverse openings in bosses 20 on the upper portion of the end link adjacent to the buttress 16. This locking-pin 19 may be securely held in place by a cotter-pin 21 located in a transverse opening in the locking-pin 19 near one of its ends. Thus it will be understood that when a chain of links 13 has been formed of a requisite length, a band to properly fit within the tire-casing 10, can be provided by simply uniting the end links by means of the coupling-arm 17 and locking-pin 19 therefor, and that said band will be flexible by reason of its jointed connections.

Each link of the band 12, is provided with a pair of spaced clamping-jaws or plates 22, which are segmental in shape and depend from or extend outwardly of the links and transversely thereof and each jaw or plate 22 has an extension 23 on each side of its link, which extensions have their outer surfaces curved to coincide with the arcs described by the jaws 22, and as shown in Figs. 2 and 8, project above or inwardly of the links to which they are fixedly secured or with which they are integrally formed.

In the construction shown in Figs. 1 and 2, the jaws 22 forming pairs between which the hinges of the links are located, are provided with a series of depressions 24, on their adjacent surfaces for the reception of projections 25 on the opposed surfaces of the webs 26 of the rubber or resilient tread-members 27 which are segmental in shape and of sufficient size to extend at their ends beyond the extensions 23 of the jaws 22, between which and the casing the said tread members are located.

As shown in different views of the drawings, the web 26 of each of the tread-members is of less thickness than the base of said member, and that by reason of this construction a pair of shoulders 28 on each tread member will be provided upon which the outer portions of the jaws 22 will rest. By this arrangement, it is obvious that when the tread members are made of resilient material, lateral, as well as radial supporting resiliency will be afforded to the clamping jaws of the flexible or supporting band.

In Figs. 5 and 6 of the drawings is shown a modification in the construction of the tread members, which consists in providing each of the webs 26 thereof with a series of spaced transverse openings, in each of which is located a coil spring 29 which will nest at their ends in recesses 30 in the adjacent surfaces of the clamping jaws of the supporting band. In this modified construction the tread members may be made of metal or non-resilient material, or of resilient material, but when made of non-resilient material, it is obvious that the springs 29 extending out of said openings and resting against the inner faces of said jaws will normally project the latter out of contact with the members 26 and will furnish lateral resiliency to the clamping jaws.

In Figs. 7 and 8, is shown another modification in the construction of the tread members, which consists in making the same of like construction and similar material as shown in Figs. 1 and 2, and above described, except that the webs 26 are provided in their faces with concave grooves 31, to receive corresponding ribs 32 on the adjacent surfaces of the clamping jaws of the supporting band.

It is manifest that after the supporting band and its associated members have been placed in the casing and the ends of the band connected together, the casing will be distended thereby and maintained in such condition for use, and that in the rotation of the wheel on which the tire is mounted, pressure will be applied to the tread members in such a way that the hinges of the links of the band will act as fulcrums for the links, which in turn will act as levers for the clamping jaws, thus causing them to coact with the interposed tread members to afford great resiliency and efficiency.

As the tread members are spaced from each other it is apparent that air chambers will be provided which will prevent undue heating of the parts.

By employing a tire embodying my improvements, it will be readily understood and clearly seen that great efficiency, durability, resiliency and economy will be afforded, and that if the tire casing is punctured or badly cut a resilient tire will still be furnished by reason of the peculiar construction and arrangement of the supporting band and its parts, or of the tire casing filler.

Having thus fully described the invention, what I claim as new and desire to secure by Letters Patent is—

1. In a resilient tire, the combination of a circular casing, with a jointed band located therein at a distance from its outer or tread portion, a clamping jaw transversely mounted on the band on each side of each joint thereof providing a pair of spaced jaws at each joint, and a tread member interposed between the members of each of said pairs of jaws.

2. In a resilient tire, the combination with a circular casing, of a transversely jointed band located therein at a distance from its outer or tread portion, a clamping jaw having its outer edge rounded and transversely mounted on the band on each side of each joint thereof providing a pair of spaced jaws at each joint, and a tread member interposed between and outwardly of the members of each of said pairs of said jaws.

3. In a resilient tire, the combination with a circular casing, of a transversely jointed band located therein at a distance from its outer or tread portion, a segmental clamping jaw transversely mounted on the band on each side of each joint thereof providing a pair of spaced jaws at each joint, and a segmental tread member having an inwardly extended web of less width than its base interposed between the members of each pair of said jaws, the base of each of said tread members being interposed between the outer surfaces of the jaws and the said casing.

4. In a resilient tire, the combination with a circular casing, of a transversely jointed band located therein at a distance from its outer or tread portion, a segmental clamping jaw transversely mounted on the band on each side of each joint thereof providing a pair of spaced jaws at each joint, and a segmental tread member interposed between and outwardly of the members of each of said pairs of jaws, that portion of each of said tread members interposed between the said jaws having resilient means to co-act with the latter.

5. In a resilient tire, the combination with a circular casing, of a transversely jointed band located therein, a clamping jaw transversely mounted on the band on each side of each joint thereof providing a pair of spaced jaws at each joint, and a resilient tread member interposed between the members of each of said pairs of jaws.

6. In a resilient tire, the combination with a circular casing, of a transversely jointed band located therein, a segmental clamping jaw transversely mounted on the outer surface of the band on each side of each joint thereof providing a series of spaced jaws on the periphery of the band arranged with a pair of jaws at each joint, and a tread member interposed between the members of each of said pairs of jaws.

7. In a resilient tire, a transversely jointed band consisting of a plurality of sections hinged together at their ends and each section having on its outer surface a pair of transversely disposed and spaced clamping jaws, and a tread member interposed between the jaw near one end of one of said sections and the jaw near the adjacent end of the adjacent section throughout the series of sections.

8. In a resilient tire, a band consisting of a plurality of sections hinged together at their ends and each section having on its outer surface a pair of transversely disposed and spaced clamping jaws, and a tread member interposed between the jaw near one end of one of said sections and the jaw near the adjacent end of the adjacent section throughout the series of sections, the tread members and their respective clamping jaws having co-acting engaging means.

9. A supporting band for tire casings, consisting of a plurality of elongated frame like sections pivotally connected together at their ends and each section having on its outer surface a pair of transversely disposed segmental clamping jaws spaced from one another, and a segmental resilient tread member having an inwardly extended web of less width than its base interposed between the members of each pair of the clamping jaws located at the pivots of the sections, the base of each of said tread members being located outwardly of the outer surfaces of the pair of jaws between which its web is located.

10. A supporting band for tire casings, including a pair of sections pivotally connected at their adjacent ends and each having on its outer surface near its pivoted end a transversely disposed clamping jaw.

11. A supporting band for tire casings, including a pair of sections pivotally connected at their adjacent ends and each having on its outer surface near its pivoted end a transversely disposed clamping jaw, and a tread member interposed between said jaws, the said member and jaws having on their adjacent surfaces co-acting engaging means.

12. A supporting band for tire casings, including a pair of sections pivotally connected at their adjacent ends and each having on its outer surface near its pivoted end a transversely disposed clamping jaw, and a tread member interposed between said jaws.

CLYDE S. MORSE.